United States Patent [19]

Brown, Jr.

[11] 4,080,104

[45] Mar. 21, 1978

[54] WET-DRY VACUUM APPARATUS WITH PUMP MEANS FOR DISCHARGING LIQUID THEREFROM

[76] Inventor: Edward C. Brown, Jr., 423 Churchill Dr., Berwyn, Pa. 19312

[21] Appl. No.: 686,272

[22] Filed: May 14, 1976

[51] Int. Cl.² ............................ F04B 49/04; A47L 5/22
[52] U.S. Cl. ........................................ 417/17; 417/40; 15/385
[58] Field of Search ................. 15/385; 222/383, 385; 417/40, 17

[56] References Cited

U.S. PATENT DOCUMENTS

| | | | |
|---|---|---|---|
| 2,909,800 | 10/1959 | Grindle | 15/353 |
| 2,984,106 | 5/1961 | Kamm | 222/385 |
| 3,431,582 | 3/1969 | Grave | 15/353 |
| 3,597,902 | 10/1971 | Williams | 15/353 |
| 3,618,297 | 11/1971 | Hambrick | 13/353 |
| 3,774,260 | 11/1973 | Amos | 15/353 |
| 3,775,951 | 12/1973 | Eicholz | 15/353 |
| 3,940,826 | 3/1976 | Phillips | 15/353 |

*Primary Examiner*—William L. Freeh
*Attorney, Agent, or Firm*—Stevens, Davis, Miller & Mosher

[57] ABSTRACT

A wet-dry vacuum apparatus is disclosed for continuously picking up liquid and conveying it into a tank and for simultaneously removing the liquid from the tank when necessary. The apparatus includes a tank for holding liquid. The tank includes a vertical drum, a removable cover for closing the upper end of the drum, and a bottom plate for closing the lower end of the drum. A motor driven vacuum pump is mounted on the cover for sucking liquid to be picked up into the tank through an inlet opening into the upper end of the drum. The apparatus further includes a liquid pump, driven by an electric motor, in the tank carried by the cover for discharging liquid from the tank under pressure through an outlet opening in the cover. A first float, positioned in the tank, closes a first switch, which electrically connects the liquid pump to a power source, when a first predetermined liquid level in the tank is reached to thereby actuate the liquid pump to discharge liquid from the tank. A second float, in the tank, opens a second switch, which electrically connects the vacuum pump motor to the power source, when a maximum desired or second predetermined liquid level higher than the first level is reached in the tank to thereby deactuate the vacuum pump. In operation, liquid can be sucked into the tank through the inlet opening and when the liquid reaches the first predetermined level, the liquid can be simultaneously discharged by said pump through the outlet opening and, if the liquid reaches the second predetermined level, the vacuum pump is deactuated to prevent the level from going above the maximum desired or second predetermined level.

5 Claims, 2 Drawing Figures

WET-DRY VACUUM APPARATUS WITH PUMP MEANS FOR DISCHARGING LIQUID THEREFROM

BACKGROUND OF THE INVENTION

1. Field of the Invention

This invention relates to a new and useful wet-dry vacuum apparatus for continuously picking up liquid and conveying it into a tank and for simultaneously removing the liquid from the tank when necessary. As a result of the invention, liquid can be readily removed from an area, such as the surface of a floor, sucked into the tank, and discharged therefrom by a pump means to a remote location.

2. Description of the Prior Art

Removal of liquid from a surface area, such as a floor or other flat surface, to an area remote from the wetted area is known to be a difficult and time consuming operation. One of the most common means of removing water from a surface is, or course, hand mopping. This procedure is however both time consuming and burdensome. Additionally, it is extremely difficult quickly to remove a considerable amount of water on a surface to prevent that water from damaging any covering, such as floor tile, or to prevent that water from seeping through the floor if made of wood.

Sump pumps have also been used to remove large quantities of water. Although these pumps remove the water immediately as it is picked up they are at times unsatisfactory since they generally only remove water from the immediate area in which they are located. They are not readily movable to pick up smaller quantities of water from different yet closely located areas. Also, power operated devices such as conventional wet-dry vacuum cleaners can pick up and store liquids. However, when the storage tank for those vacuum cleaners is full, the entire tank, which may be very heavy because of the weight of water therein, must be moved to a location, such as a drain, where the water can be poured or drained from the tank. These repeated moving and dumping operations for conventional wet-dry vacuum cleaners are also burdensome and time consuming.

SUMMARY OF THE INVENTION

This invention relates to a wet-dry vacuum apparatus for continually picking up liquid and conveying it into a tank and for simultaneously removing liquid from the tank when necessary. As a result, the invention offers all of the advantages of conventional wet-dry vacuum cleaners, i.e., that water can be picked up from many different areas and conveyed into a tank. Additionally, because of the provision in the invention of a pump means on the vacuum apparatus, liquid in the tank can be discharged therefrom to a remote location. As a result, water can be picked up from a wetted surface area in an efficient, continuous, and easy manner.

Accordingly, an object of this invention is to provide a wet-dry vacuum apparatus which will efficiently pick up liquid and convey it into a tank and simultaneously remove the liquid from the tank when necessary.

A further object of this invention is to provide a wet-dry vacuum apparatus which can continuously pick up water from a wetted and convey that liquid to a remote location without requiring repeated dumping or discharging of the tank.

An additional object of this invention is to provide a wet-dry vacuum apparatus which is easy to operate.

The wet-dry vacuum apparatus of this invention for continuously picking up liquid and conveying it into a tank and for simultaneously removing the liquid from the tank when necessary includes a tank for holding liquid. The tank comprises a vertical drum, a removable cover for covering the upper end of the drum, and a bottom plate closing the lower end of the drum. An inlet opening is provided in the drum adjacent the upper end thereof and an outlet opening is provided in the cover. An inlet hose has one end connected to the inlet opening and the other end thereof outside the tank. Likewise, an outlet hose has one end connected to the opening and the other end thereof outside the tank.

A vacuum pump is mounted on the cover and a liquid pump provided in the tank for discharging liquid from the tank under pressure through the outlet opening. The pump is operable simultaneously with the vacuum pump so that liquid may be continuously conveyed into and discharged from the tank to a remote location. The pump is rigidly connected to and carried by the cover and is in the drum adjacent the lower end thereof when the cover is on the upper end of the drum. The invention further includes a substantially horizontal support plate on which the liquid pump is supported. A plurality of vertically extending bars interconnect the support plate and the cover. Each of the bars has a length substantially the same as but slightly less than that of the drum so that when the cover is on the upper end of the drum, the support plate and the liquid pump are supported thereon and are not in contact with the bottom of the drum.

The liquid pump and the vacuum pump are driven by electric motors. A first switch electrically connects the liquid pump motor to a power source and a second switch electrically connects the vacuum pump motor to the power source. A first float is provided in the tank for closing the first switch when the level of liquid in the tank reaches a first predetermined level to thereby actuate the liquid pump. A second float is also provided in the tank for opening the second switch when a second predetermined liquid level, higher than the first level, is reached in the drum to thereby deactuate the vacuum pump.

As a result of the invention, liquid can be sucked into the tank by the vacuum pump through the inlet opening and, when the liquid reaches the first predetermined level, the liquid can be simultaneously discharged by the pump through the outlet opening and, if the liquid reaches the second predetermined level, the vacuum pump is deactuated to prevent the level from rising above the second level.

When the invention is being used only as a dry vacuum a cap can be placed over the liquid outlet opening. This will prevent air from flowing in from the liquid outlet.

DESCRIPTION OF THE PREFERRED EMBODIMENTS

Figure 1:
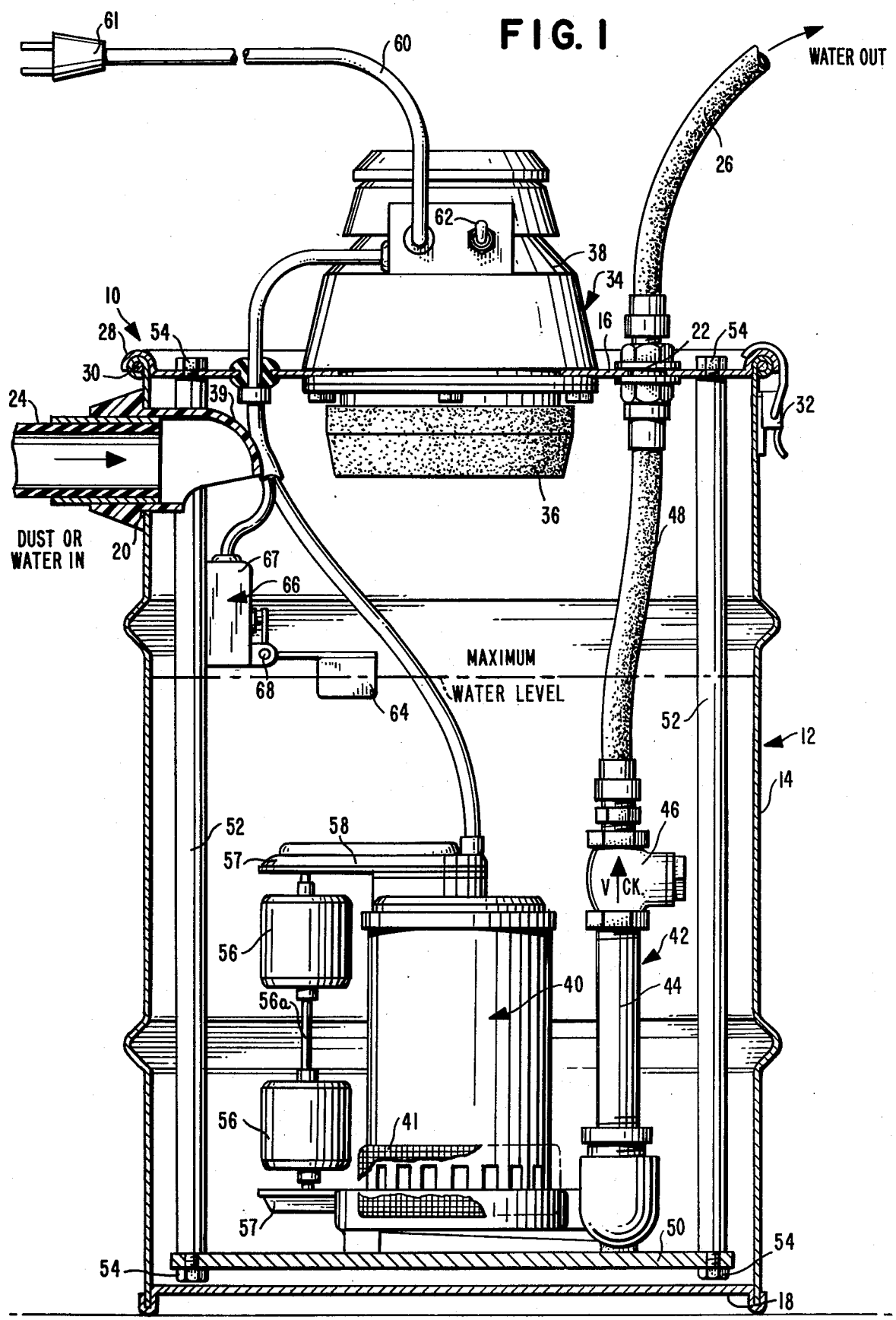
FIG. 1 is a vertical cross-sectional view of the invention.

With reference to FIG. 1, the wet-dry vacuum apparatus 10 of this invention includes a tank 12 which comprises a vertical drum 14 circular in horizontal cross-section, a removable circular cover 16 for covering the upper end of the drum 14 in fluid tight fashion, and a circular bottom plate 18 for closing the lower end of the drum 14 in fluid tight fashion. The tank 12 further includes an inlet opening 20 in the drum 14 adjacent the upper end thereof and an outlet opening 22 in the cover. A flexible inlet hose 24 has one end releasably connected to the inlet opening 20. The other end of the hose 24 is outside the tank and may be manipulated in conventional fashion to pick up material or liquid. An elongated flexible outlet hose 26 has one end releasably connected through a conventional coupling to the outlet opening 22. The other end of the hose 26 is outside the tank 12 and can be positioned at a desired remote location for discharge of liquid.

The cover 16 has a curved annular flange 28 that fits on a roll 30 on the upper edge of the drum 14. The cover is held on the drum by a plurality of releasable fasteners 32 (only one of which is shown in FIG. 1) circumferentially spaced about the upper end of the drum 14. Handles may be provided on the drum and the cover for lifting them when desired. The handles on the cover assist in removal of the cover from the drum. Likewise, it will be evident to persons skilled in the art that wheels, castors, etc., could be provided to support the tank 10 and thereby render it more mobile.

A vacuum pump 34 is mounted above the cover 16 and an air filter screen 36 projects below the cover 16. The vacuum pump is driven by an electric motor 38 which is also mounted on the cover 16. The vacuum pump 34 may be of any conventional type known to persons skilled in the art. When the vacuum pump 34 is driven by the motor 38, liquid or other material is sucked into the tank 12 through the inlet hose 24 and the inlet opening 20. An air outlet opening is provided in the motor housing for the vacuum pump 34.

A liquid pump 40 is provided in the bottom of the tank 12. The discharge end of the pump 40 is connected by means of a conduit 42 to the outlet opening 22 and the outlet hose 26. The conduit 42 includes a first pipe section 44, a check valve 46, and a hose section 48 which is connected by a conventional coupling to the outlet opening 22. The check valve 46, which is between the pump 40 and the outlet opening 22, functions to prevent the flow of liquid in the conduit 42 in a direction from the outlet opening 22 or the outlet hose 26 toward the pump 40.

The liquid pump 40 is driven by an electric motor mounted in its housing and is rigidly secured by bolts, etc., to a support plate 50. The support plate 50 is connected to the cover 16 by a plurality of vertically extending bars 52. The bars are connected to the cover 16 and the support plate 50 by a plurality of bolts 54 which extend through apertures in the cover 16 and the support plate 50. As a result, the liquid pump 40 is supported and carried by the cover 16 and is removable from the drum 14 with the cover 16 when it is removed. As shown in FIG. 1, each of the bars 52 has a length substantially the same as but slightly less than that of the drum 14 so that, when the cover 16 is on the upper end of the drum 14, the support plate 50 and the liquid pump 40 are supported by cover 16 thus insuring a tight seal between the flange 28 and the roll 30 with clearance between the plate 50 and bottom plate 18 of the tank 12.

The drum 14 may have a guide member 39 as part of the inlet opening 20. The guide member 39 functions to turn the flow of liquids, solids, or other material coming into the tank downwardly so that the incoming material does not strike the filter screen 36. If a guide member 39 is provided, then the support plate 50 should be appropriately notched so that it can pass and not be blocked by the guide member 39 when the cover 16 and support plate 50 are removed from the drum 14.

A float 56 is mounted inside the tank 12 adjacent the liquid pump 40 between a pair of vertically spaced brackets 57. The float 56 is mounted to be movable with a rod 56a through appropriate guides in the brackets 57. The float 56 is vertically movable in the guides and closes a first switch 58, in the motor housing, which electrically connects the motor for the liquid pump 40 to a source of power. The source of power is fed to the switch 58 and to a second switch 66 to be described, through an electrical plug 61, a lead wire 60 and a main on-off switch 62. The circuit for the electrical components of the invention is shown in FIG. 2.

Figure 2:
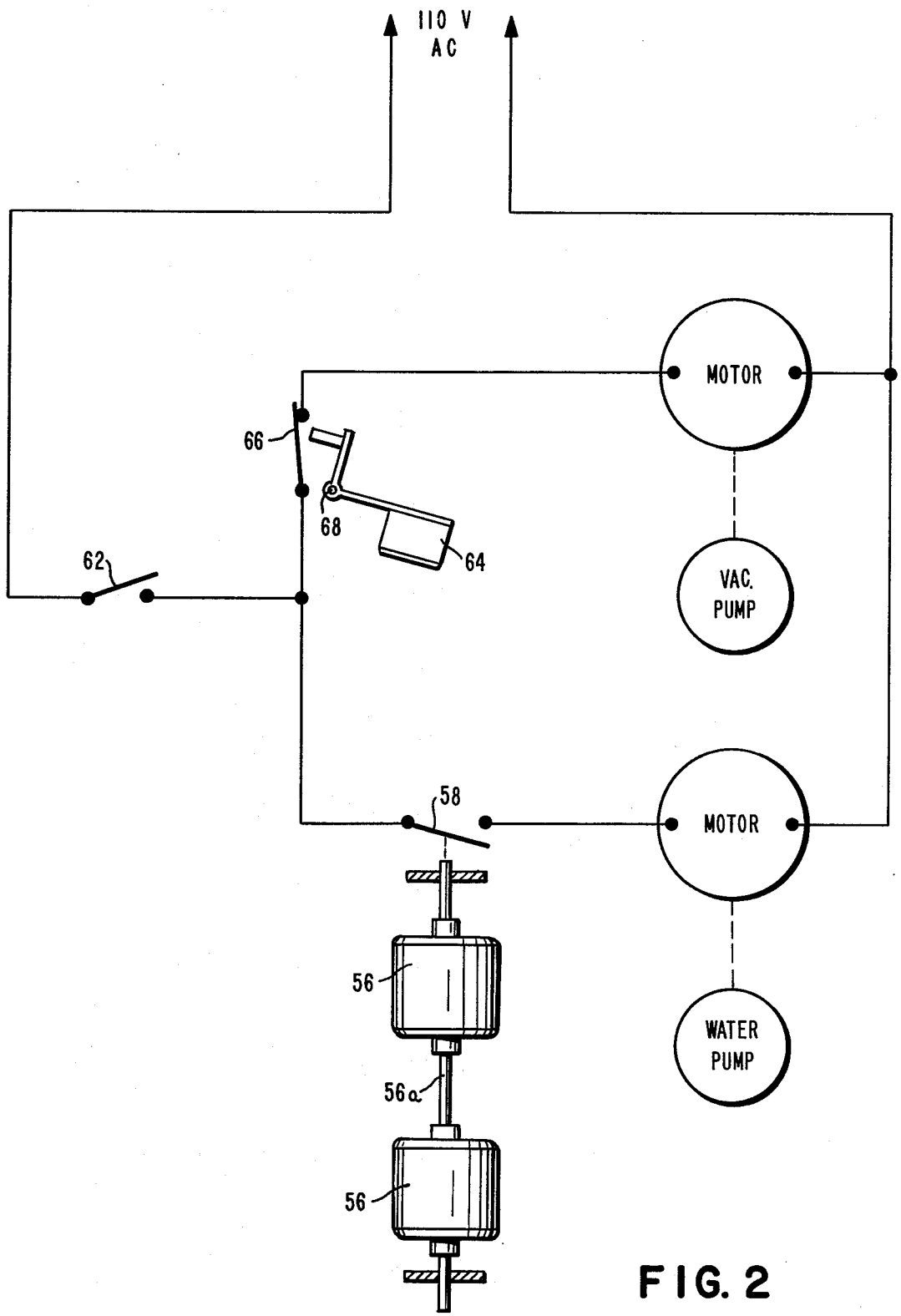
FIG. 2 is a circuit diagram of the invention which also shows switch actuating floats.

In operation, when there is no liquid in the tank, the float 56 is in its lower position, the switch 58 is in its normally open position as shown in FIG. 2, and power is not transmitted to the motor for the liquid pump 40 so that the pump 40 is not driven. However, as liquid coming into the tank begins to fill it and reaches a first predetermined level adjacent the float body 56, the buoyant 56 will move upwardly and close the switch 58 to connect the power source to the motor for the liquid pump 40. As a result, the pump 40 will be driven to discharge liquid in the tank 12 out through the conduit 42, the outlet opening 22 and the outlet hose 26. It will of course be apparent to persons skilled in the art, that the liquid pump 40 could operate continuously whenever desired and could be controlled by an individual on-off switch or directly by the main on-off switch 62.

A second float 64 is disposed in the tank 14 at a second predetermined liquid level which is higher than that of the first predetermined level referred to above. The second float 64 functions to open the second switch 66, which is normally closed, when the water in the tank reaches the second level (referred to as the maximum water level in FIG. 1). The function of the second float 64 and the second switch 66 is to cut off power to the motor 38 for the vacuum pump 34 in the event that the liquid pump 40 cannot move sufficient liquid from the tank 12 so that the water level does not rise to the extent that the tank is filled or to the extent that the motor 38 could be damaged by contact with such water. The switch 66 is mounted in a casing 67 secured to one or more of the bars 52 and the float 64 is pivotally mounted on the casing 67 about a pivot axis 68. The switch 66 is connected by appropriate electrical connections to the main on-off switch 62 as is the first switch 58.

In operation with the tank 12 empty, the electrical plug is inserted into an electrical outlet, and the main on-off switch 62 is switched to its "on" position to electrically connect the power source to the switches 58 and 64. The first switch 58 is in its normally open position and the second switch 64 is in its normally closed position. As a result, the motor 38 drives the vacuum pump 34 and the liquid pump is not driven. The vacuum created in the tank 12 sucks liquid or other material which is desired to be picked up through the inlet 24 and the inlet opening 20 into the tank 12. If the material is not liquid then that material will have no effect on the floats 56 and 64. However, assuming that liquid such as water is being sucked into the tank, the level of liquid in the tank will begin to rise until such time as the water reaches the first predetermined level adjacent the float body 56 at which time the float 56 rises and closes the first switch 58 which thereby electrically connects the motor for the liquid pump 40 to the power source. At such time, the pump 40 is driven and water in the tank 12 is discharged from the tank through the conduit 42, the outlet opening 22 and the outlet hose 26. The outlet hose 26 can of course be of considerable length so that for instance, it could be run from a remote corner of a basement out one of the basement windows. By means of such operation, the water may be picked up as easily as is done with a conventional wet-dry vacuum, yet the tank 12 does not have to be repeatedly emptied by pouring or draining. Instead, because of the simultaneous operation of the pump 40 and the vacuum pump 34, the liquid can be continuously conveyed into and simultaneously removed from the tank. The liquid pump has an inlet screen or filter 41 to prevent entry of dirt into the pump.

In the event that, for any reason, the amount of liquid coming into the tank 12 exceeds that which the liquid pump 40 is able to discharge from the tank 12, the water level will rise above the first predetermined level. If the water rises up to the second predetermined level or maximum desired water level, the float 64 will be moved upwardly and pivoted about the axis 68 to open the second switch 66 which thereby cuts off the electrical connection of the motor 38 for the vacuum pump 34 from the power source. As a result, the vacuum pump 34 is deactuated and water is no longer sucked into the tank 12 until such time as the liquid pump 40 removes sufficient liquid from the tank 12 to again lower the float 64 at which time the second switch 66 will automatically close and connect the source of power to the motor 38 for the vacuum pump 34 to actuate that motor. Of course when the vacuuming operation is completed, the main on-off switch 62 is moved to its "off" position.

It is believed apparent from the above description of the invention that the wet-dry vacuum apparatus of this invention enables liquid to be picked up and conveyed into a tank and simultaneously removed from the tank without requiring repeated emptying or draining of the tank.

In a working model a J. C. Penney's wet-dry vacuum model 6012 was used along with a Wayne sump pump model SSP-301V having a capacity of 2270 gallons per hour against a 10 foot discharge head through a 1 ½ inch discharge tube.

What I claim is:

1. A wet-dry vacuum apparatus for continuously picking up liquid and conveying it into a tank and for simultaneously removing the liquid from the tank when necessary, said apparatus comprising:
 a tank for holding liquid, said tank having an inlet opening and an outlet opening therein and comprising a vertical drum open at its upper end and a removable cover for covering the upper end of the drum,
 means on said cover for sucking liquid into said tank through said inlet opening;
 a pump in the lower end of the drum for discharging liquid from said tank under pressure through said outlet opening, said pump being operable simultaneously with said sucking means;
 a first electric motor for driving said pump;
 a second electric motor for driving said sucking means;
 a first switch electrically connecting the first motor to a power source, said first switch being open when the level of liquid in the tank is below a first predetermined level;
 a second normally closed switch electrically connecting the second motor to the power source;
 a first float in the tank for closing said first switch when the first predetermined liquid level is reached in the tank to thereby actuate said pump; and
 a second float in the tank for opening said second switch when a second predetermined liquid level higher than said first level is reached in the drum to thereby deactuate only said sucking means whereby liquid can be sucked into said tank through said inlet opening and when the liquid reaches the first predetermined level the liquid can be simultaneously discharged by said pump through said outlet opening and if the liquid level rises to the second predetermined level said sucking means is deactuated to prevent the level from rising above said second level.

2. An apparatus as claimed in claim 1, further comprising:
 a conduit interconnecting said pump and said outlet opening; and
 a check valve in said conduit for blocking flow of liquid into said pump from said outlet opening.

3. An apparatus as claimed in claim 1, wherein: said sucking means comprises a vacuum pump.

4. An apparatus as claimed in claim 1, wherein: said inlet opening is in the drum adjacent the upper end thereof, and
said outlet opening is in the cover.

5. An apparatus as claimed in claim 4, further comprising:
 an inlet hose, one end of which is connected to the inlet opening and the other end thereof is outside said tank, and
 an elongated outlet hose, one end of which is releasably connected to the outlet opening and the other end thereof is outside said tank whereby said outlet hose can be disconnected from the outlet opening in the cover when desired.

* * * * *